US012804062B2

(12) United States Patent
Jeon et al.

(10) Patent No.: US 12,804,062 B2
(45) Date of Patent: Nov. 17, 2026

(54) FOLDABLE DISPLAY DEVICE

(71) Applicant: LG Display Co., Ltd., Seoul (KR)

(72) Inventors: Minwoo Jeon, Busan (KR); SeongHyeon Lee, Goyang-si (KR); Jungmin Lee, Seoul (KR); JongGun Lee, Paju-si (KR)

(73) Assignee: LG Display Co., Ltd. (KR)

( * ) Notice: Subject to any disclaimer, the term of this patent is extended or adjusted under 35 U.S.C. 154(b) by 343 days.

(21) Appl. No.: 18/527,446

(22) Filed: Dec. 4, 2023

(65) Prior Publication Data

US 2024/0195894 A1 Jun. 13, 2024

(30) Foreign Application Priority Data

Dec. 13, 2022 (KR) ........................ 10-2022-0173936

(51) Int. Cl.
*H04M 1/02* (2006.01)

(52) U.S. Cl.
CPC ....... *H04M 1/0216* (2013.01); *H04M 1/0268* (2013.01); *H04M 1/0283* (2013.01)

(58) Field of Classification Search
CPC . H04M 1/0216; H04M 1/0268; H04M 1/0283
USPC ....................................................... 455/575.3
See application file for complete search history.

(56) References Cited

U.S. PATENT DOCUMENTS 9,704,932 B2 * 7/2017 Lee ....................... G06F 1/1652
9,923,156 B2 * 3/2018 Jeong .................... G06F 1/1652
11,175,693 B2 * 11/2021 Song ..................... G06F 1/1616
11,989,055 B2 * 5/2024 Soh ....................... G06F 1/1656
12,150,287 B2 * 11/2024 Park ................... H05K 7/20445
12,455,645 B2 * 10/2025 Kong .................... G06F 3/0412
2006/0231837 A1 * 10/2006 Wuchse ............... H10K 59/179 257/59
2010/0002314 A1 * 1/2010 Duparre ............. G02B 13/0085 359/773
2010/0187979 A1 * 7/2010 Shim ..................... G02F 1/1345 313/504
2014/0029212 A1 * 1/2014 Hwang ................... G09F 9/301 361/749
2014/0065326 A1 * 3/2014 Lee ................... G02F 1/133305 428/12
2015/0151515 A1 * 6/2015 Skepton .................... B32B 7/06 428/354

(Continued)

FOREIGN PATENT DOCUMENTS

CN 104854488 A 8/2015
CN 111312065 A 6/2020

(Continued)

*Primary Examiner* — April G Gonzales
(74) *Attorney, Agent, or Firm* — Fish & Richardson P.C.

(57) ABSTRACT

A foldable display device, and more particularly, a foldable display device includes a flexible display panel; a support member disposed below the flexible display panel; and a cover member disposed on the flexible display panel, in which the cover member includes a glass disposed on the flexible display panel; a first adhesive layer disposed on the glass; and a barrier film disposed on the first adhesive layer, and a thickness of the barrier film is 30 μm to 70 μm, a thickness of the first adhesive layer is 5 μm to 10 μm, and a modulus of the first adhesive layer is $5\times10^4$ Pa to $5\times10^8$ Pa.

17 Claims, 5 Drawing Sheets

(56) References Cited

U.S. PATENT DOCUMENTS

| | | | | |
|---|---|---|---|---|
| 2015/0330614 | A1* | 11/2015 | Lee | B65D 85/38 206/45.23 |
| 2015/0346408 | A1 | 12/2015 | Mizutani et al. | |
| 2016/0212890 | A1* | 7/2016 | Jeong | G06F 1/1652 |
| 2016/0380033 | A1* | 12/2016 | Lee | G06F 1/16 257/40 |
| 2017/0084673 | A1* | 3/2017 | Lee | G06F 1/1643 |
| 2017/0170200 | A1* | 6/2017 | Ikeda | G09G 3/3233 |
| 2017/0357289 | A1* | 12/2017 | Ahn | B32B 27/06 |
| 2018/0203487 | A1* | 7/2018 | Kee | G06F 1/1652 |
| 2018/0351117 | A1* | 12/2018 | Kim | H10K 59/127 |
| 2019/0200466 | A1* | 6/2019 | Kim | G06F 1/1641 |
| 2019/0250663 | A1* | 8/2019 | Park | G06F 1/1618 |
| 2019/0334114 | A1* | 10/2019 | Park | G06F 1/1641 |
| 2020/0194724 | A1 | 6/2020 | Ahn et al. | |
| 2020/0285282 | A1* | 9/2020 | Choi | G06F 1/1641 |
| 2021/0064088 | A1* | 3/2021 | Kim | G06F 1/1616 |
| 2021/0065589 | A1* | 3/2021 | Wang | G06F 1/1616 |
| 2021/0072790 | A1* | 3/2021 | Myeong | G06F 1/1616 |
| 2021/0096600 | A1* | 4/2021 | Soh | G06F 1/1652 |
| 2021/0103313 | A1* | 4/2021 | Soh | G06F 1/1616 |
| 2021/0120691 | A1 | 4/2021 | Su et al. | |
| 2021/0141124 | A1* | 5/2021 | Park | G02B 1/14 |
| 2021/0174711 | A1* | 6/2021 | Cho | G06F 1/1616 |
| 2021/0233447 | A1* | 7/2021 | Park | G06F 1/1616 |
| 2021/0410302 | A1* | 12/2021 | Jeong | B32B 3/16 |
| 2022/0025226 | A1* | 1/2022 | Tabata | C09J 4/06 |
| 2022/0037601 | A1* | 2/2022 | Lee | B32B 17/06 |
| 2022/0155821 | A1* | 5/2022 | Kim | B32B 7/12 |
| 2022/0191312 | A1* | 6/2022 | Yan | G09F 9/301 |
| 2022/0201874 | A1* | 6/2022 | You | G06F 1/1641 |
| 2022/0206529 | A1* | 6/2022 | Lee | G06F 1/1652 |
| 2022/0208931 | A1* | 6/2022 | Han | H10K 59/131 |
| 2022/0216436 | A1* | 7/2022 | Kim | B32B 3/30 |
| 2022/0255029 | A1* | 8/2022 | Hayakawa | B32B 27/00 |
| 2022/0346241 | A1* | 10/2022 | Sunwoo | H05K 5/0018 |
| 2023/0017835 | A1* | 1/2023 | Lee | G02B 1/14 |
| 2023/0018597 | A1* | 1/2023 | Kim | H04M 1/0283 |

FOREIGN PATENT DOCUMENTS

| | | | |
|---|---|---|---|
| CN | 111599268 | A | 8/2020 |
| CN | 114068839 | A | 2/2022 |
| KR | 10-2020-0033366 | A | 3/2020 |
| KR | 10-2020-0052016 | A | 5/2020 |
| KR | 10-2020-0053234 | A | 5/2020 |
| KR | 10-2020-0073596 | A | 6/2020 |
| KR | 10-2021-0052422 | A | 5/2021 |

* cited by examiner

FOLDABLE DISPLAY DEVICE

CROSS-REFERENCE TO RELATED APPLICATION

This application claims the priority of Korean Patent Application No. 10-2022-0173936 filed on Dec. 13, 2022, which is hereby incorporated by reference in its entirety.

BACKGROUND

Field of the Disclosure

The present disclosure relates to a foldable display device, and more particularly, to a foldable display device which simultaneously satisfies a surface hardness, an impact resistance characteristic, and a folding characteristic.

Description of the Background

Recently, as it enters into an information era, a display field which visually expresses electrical information signals has been rapidly developed and in response to this, various display devices having excellent performances such as thin-thickness, light weight, and low power consumption have been developed. Specific examples of such display devices include a liquid crystal display (LCD) device, a Quantum-dot Light Emitting Display device, a plasma display panel (PDP) device, a field emission display (FED) device, an organic light emitting display (OLED) device, and an inorganic light emitting display device and the like.

Recently, a shape or a size of the display device has gradually diversified and in particularly, an interest in a flexible display device which maintains a display performance as it is even though the display device is folded or bent is consistently increasing. In accordance with this interest, research and development on display panels, fixtures, and cover members having a specific radius of curvature are being actively conducted.

Specifically, a cover member mainly uses a glass material having an excellent surface quality as a component which is exposed to a user at an outside of the display device. However, the foldable display device uses a polymer base member having an excellent folding characteristic as compared with the glass material to ensure the folding characteristic.

SUMMARY

A cover member of a polymer material has an advantage in that the folding characteristic is excellent and the thickness may be freely designed as compared with the glass material, but also has a problem in that the surface hardness is relatively inferior.

Accordingly, a cover member in which the glass and a polymer film are laminated has been proposed. In the case of such a cover member, to maximize a folding characteristic, the polymer film and the glass are bonded using an adhesive layer having a low modulus, which caused another problem in that a dent characteristic was relatively inferior.

Further, to improve the surface hardness and the dent characteristic of the cover member, if a modulus of the adhesive layer between the polymer film and the glass base member is increased, a tensile stress of a lower portion of the glass base member is increased so that the glass base material is easily broken.

Accordingly, the present disclosure is to provide a foldable display device including an improved impact resistance characteristic with a high surface hardness.

The present disclosure is also to provide a foldable display device which has an excellent folding characteristic, excellent surface hardness, and excellent impact resistance characteristic even though an adhesive layer having a high modulus is applied between the polymer film and the glass substrate.

The present disclosure is not limited to the above-mentioned, and other features, which are not mentioned above, may be clearly understood by those skilled in the art from the following descriptions.

According to an aspect of the present disclosure, a foldable display device may include a flexible display panel; a support member disposed below the flexible display panel; and a cover member disposed on the flexible display panel, in which the cover member includes a glass disposed on the flexible display panel; a first adhesive layer disposed on the glass; and a barrier film disposed on the first adhesive layer, and a thickness of the barrier film is 30 μm to 70 μm, a thickness of the first adhesive layer is 5 μm to 10 μm, and a modulus of the first adhesive layer is $5\times10^4$ Pa to $5\times10^8$ Pa.

Other detailed matters of the exemplary embodiments are included in the detailed description and the drawings. Additional features and aspects will be set forth in part in the following description and in part will become apparent from the following description, or may be learned by practice of the inventive concepts provided herein. Other features and aspects of the inventive concepts may be realized and attained by the structure particularly pointed out, or derivable therefrom, in the written description, the claims hereof, and the appended drawings.

According to an aspect of the present disclosure, the foldable display device has a high surface hardness and an excellent impact resistance characteristic.

According to an aspect of the present disclosure, the foldable display device applies an adhesive layer having a high modulus between a glass and a barrier film, but the folding characteristic is excellent and the surface hardness and the dent characteristic are excellent.

According to an aspect of the present disclosure, in the foldable display device, a strain applied to the glass while being folded is significantly reduced so that the problem in that the glass is cracked or broken may be solved even during the repeated folding.

The effects according to the present disclosure are not limited to the contents exemplified above, and more various effects are included in the present specification. It is to be understood that both the foregoing general description and the following detailed description of the present disclosure are exemplary and explanatory and are intended to provide further explanation of the inventive concepts as claimed.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
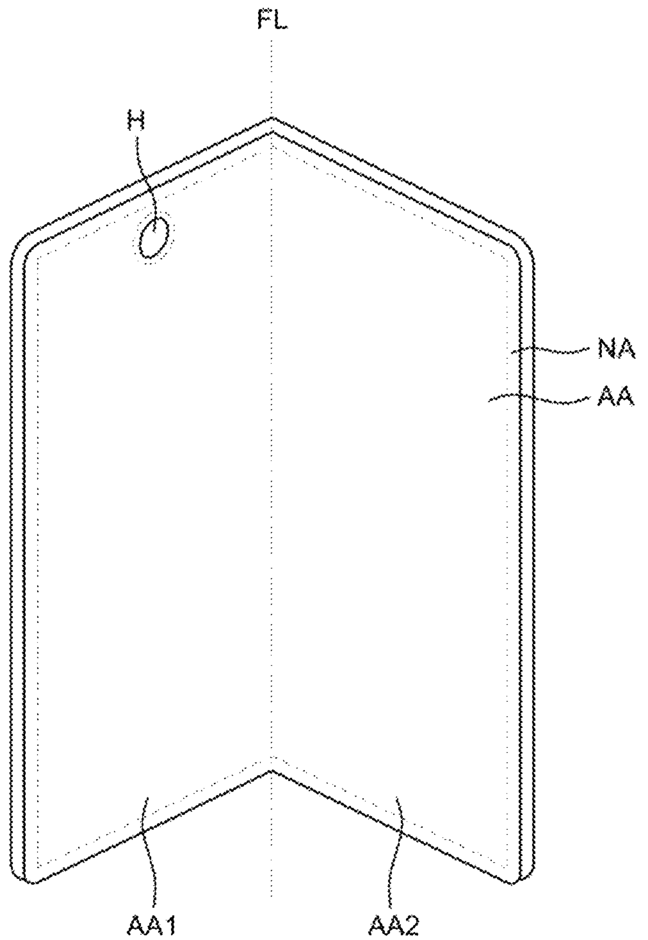
FIG. 1 is a schematic view of a foldable display device according to an exemplary aspect of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art may fully understand the disclosures of the present disclosure and the scope of the present disclosure.

The shapes, sizes, ratios, angles, numbers, and the like illustrated in the accompanying drawings for describing the exemplary embodiments of the present disclosure are merely examples, and the present disclosure is not limited thereto. Throughout the drawings and the detailed description, unless otherwise described, like reference numerals generally denote like elements, features, and structures throughout the specification. The relative size and depiction of these elements may be exaggerated for clarity, illustration, and convenience. Further, in the following description of the present disclosure, a detailed explanation of known related technologies may be omitted to avoid unnecessarily obscuring the subject matter of the present disclosure. The terms such as "including," "containing", "having," and "consist of" used herein are generally intended to allow other components to be added unless the terms are used with the term such as "merely", "only" etc. Any references to singular may include plural unless expressly stated otherwise.

Components are interpreted to include an ordinary error or tolerance range even if not expressly stated.

When the position relation between two parts is described using the terms such as "on," "over," "above," "below," "under," "beneath" and "next to," one or more parts may be positioned between the two parts unless the terms are used with the term "immediately," "just," "closely" or "directly."

When an element or layer is disposed "on" another element or layer, another layer or another element may be interposed directly on the other element or therebetween.

Although the terms "first," "second," "A," "B," "(a)," and "(b)" etc., and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure may be partially or entirely adhered to, coupled to, connected to or combined with each other and may be interlocked and operated in technically various ways, and the embodiments may be carried out independently of or in association with each other.

Hereinafter, a foldable display device according to exemplary embodiments of the present disclosure will be described in detail with reference to accompanying drawings.

Figure 2:
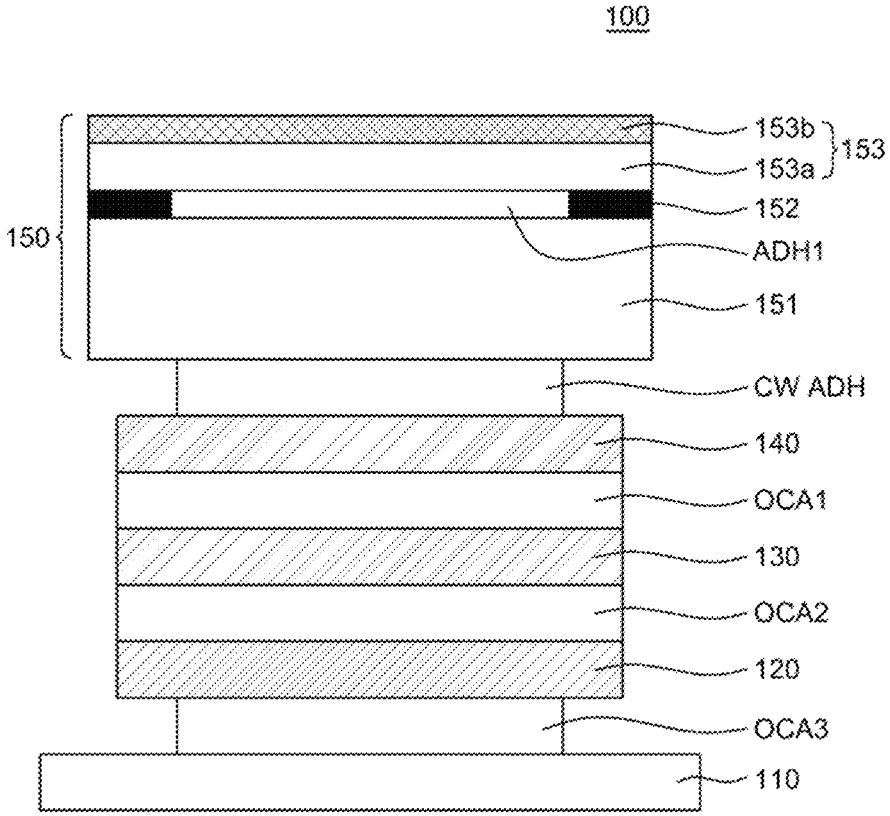
FIG. 2 is a cross-sectional view of a foldable display device according to an exemplary aspect of the present disclosure.

FIG. 1 is a schematic view of a foldable display device according to an exemplary aspect of the present disclosure and FIG. 2 is a cross-sectional view of a foldable display device according to an exemplary aspect of the present disclosure.

Referring to FIGS. 1 and 2, the foldable display device 100 according to the exemplary aspect of the present disclosure may at least include a plate assembly 110, a back plate 120, a flexible display panel 130, an optical control layer 140, and a cover member 150. The foldable display device 100 may include other layer(s), member(s) or element(s) not shown, and layer(s), member(s) or element(s) may be combined with others. The cover member 150 may for example include a glass 151, a first adhesive layer ADH1, and a barrier film 153.

Hereinafter, components of the foldable display device 100 according to an exemplary aspect of the present disclosure will be described.

First, the foldable display device 100 may include at least one folding area and at least two non-folding areas. The folding area is an area which is folded when the foldable display device 100 is folded. The folding area is folded according to a predetermined radius of curvature with respect to the folding axis FL to form a part of a circle or an oval. The non-folding area is an area which is not folded when the foldable display device 100 is folded. That is, the non-folding area maintains a flat surface state when the foldable display device 100 is folded. The non-folding area may be located on both sides of the folding area as a first active area AA1 and a second active area AA2. When the foldable display device 100 is folded, at least two non-folding areas may overlap. That is, when the foldable display device 100 is folded, the first active area AA1 and the second active area AA2 overlap each other or partially overlap each other.

The flexible display panel 130 displays an image in the active area AA. For example, the flexible display panel 130 may be an organic light emitting display panel which includes an organic light emitting layer to display images using light emitted from the organic light emitting layer. As another example, the flexible display panel 130 may be a liquid crystal display panel which adjusts a light transmittance of liquid crystals to display images. However, present disclosure is not limited thereto, the flexible display panel 130 may be Electrowetting Displays (EWDs), Electrochromic Displays, MicroLED, Electrophoretic Displays (EPDs), etc. Hereinafter, for the convenience of description, the description will be made with an example that the flexible display panel is an organic light emitting display panel, but it is not limited thereto.

The flexible display panel 130 may be divided into an active area AA and a non-active area NA. The active area AA is an area in which a plurality of pixels is disposed to display an image and may include a camera area H. In the active area AA, a pixel including an emission area for displaying images and a driving circuit for driving the pixel may be disposed. The non-active area NA is disposed to enclose the active area AA. The non-active area NA is an area where no image is displayed and various wiring lines, driving ICs, and printed circuit boards for driving the pixel disposed in the display area AA and the driving circuit are disposed. The non-active area NA may also be referred to as an edge area or a bezel area which may be an area outside of the active area AA (for example, in the vicinity of the active area AA or entirely or partly surrounding the active area AA).

The flexible display panel 130 may include a flexible substrate (not shown) and an organic light emitting diode (not shown).

The flexible substrate may support various elements which configure the flexible display panel. The flexible substrate may be a plastic substrate having flexibility to be foldable. For example, the plastic substrate may be selected from polyethylene naphthalate (PEN), cyclic olefin copolymer (COC), triacetylcellulose (TAC), polyvinyl alcohol (PVA), polyimide (PI), polyethersulfone (PES), polyethylene terephthalate (PET), and polycarbonate (PC), but is not limited thereto. In the case of the plastic substrate, due to a relatively weak barrier characteristic against foreign matters such as moisture or oxygen, to compensate therefor, the plastic substrate may have a structure in which a plastic film and an inorganic film are laminated. For example, the flexible substrate may have a plurality of layers structure in which a first polyimide (PI) film, an inorganic film, and a second polyimide film are sequentially laminated. In addition to polyimide film, Polyethylene terephthalate (PET) and Polyethylene naphthalate (PEN) may be applied to flexible substrate, as well, the PET is Lightweight and cost-effective but less heat-resistant compared to PI, and PEN Offers a balance between the properties of PET and PI.

The organic light emitting diode may be disposed on the flexible substrate. The organic light emitting diode may include an anode, a cathode, and an organic light emitting layer disposed therebetween. In the organic light emitting diode, holes injected from the anode and electrons injected from the cathode are recombined in the organic light emitting layer to emit light. The image may be displayed using the light emitted as described above.

A driving thin film transistor (not shown) may be disposed between the flexible substrate and the organic light emitting diode to drive the organic light emitting diode. The driving thin film transistor may be disposed in each of the plurality of sub pixel areas. For example, the driving thin film transistor may include a gate electrode, an active layer, a source electrode, and a drain electrode. Specifically, for example, the active layer may be disposed on the flexible substrate, and may be any of various types of semiconductor layers. For example, the active layer may be formed of one selected from among oxide semiconductor material, amorphous silicon (Si) semiconductor material, or polycrystalline semiconductor material, but the present disclosure is not limited thereto. A gate insulating layer may be disposed on the active layer to insulate the active layer from the gate electrode and may be composed of a single layer or multi-layers of silicon oxide (SiOx) or silicon nitride (SiNx), but not limited thereto. Further, an interlayer insulating layer which insulates the gate electrode from the source electrode and the drain electrode may be disposed on the substrate. The source electrode and the drain electrode which are respectively in contact with the active layer may be formed on the interlayer insulating layer. A planarization layer may be disposed between the driving thin film transistor and the organic light emitting diode. The planarization layer may planarize an upper portion of the driving thin film transistor and may be configured to protect the driving thin film transistor and to planarize a step caused due to the driving thin film transistor. The planarization layer may include a contact hole which electrically connects the driving thin film transistor and the anode. However, the structure of the driving thin film transistor is not limited thereto and may vary as needed or depending on the design, for example, the driving thin film transistor may be a bottom gate type, top gate type or a dual gate type.

When the foldable display device 100 is folded or bent, the flexible display panel 130 having a flexibility may have a difficulty to maintain the shape thereof in a predetermined form and may be vulnerable to external stimulus due to the thin thickness.

Accordingly, various types of supporting members may be disposed on the rear surface of the flexible display panel 130. For example, a back plate 120 and a plate assembly 110 may be disposed on the rear surface of the flexible display panel 130.

When a flexible substrate in a plastic material is used, a thickness is small so that the flexible display panel 130 may be sagged during the folding or bending, and to supplement for this, a back plate 120 may be disposed on the rear surface of the flexible display panel 130.

For example, the back plate 120 may be a metal material such as stainless steel (SUS) or invar, and may be formed of a plastic material such as polymethylmetacrylate (PMMA), polyimide (PI), polystyrene (PS), polycarbonate (PC), polyvinylalcohol (PVA), acrylonitrile-butadiene-styrene (ABS), polyethylene terephthalate (PET), silicone, and polyurethane (PU).

The flexible assembly 110 is disposed on the rear surface of the back plate 120. The plate assembly 110 may include a plate top and a plate bottom. The plate top and the plate bottom may be integrally formed and if necessary, the plate top or the plate bottom may also be omitted.

For example, the plate bottom may be a metal material such as stainless steel (SUS) or invar, and may be formed of a plastic material such as polymethylmetacrylate (PMMA), polyimide (PI), polystyrene (PS), polycarbonate (PC), polyvinylalcohol (PVA), acrylonitrile-butadiene-styrene (ABS), polyethylene terephthalate (PET), silicone, or polyurethane (PU).

If necessary, the back plate 120 and/or the plate assembly 110 may include an opening pattern or a groove pattern in a location corresponding to the folding area of the foldable display device 100. The opening pattern or the groove pattern allows the foldable display device 100 to be easily folded and effectively relieves a folding stress which is applied to the back plate 120 or the plate assembly 110 when folded. Further, restoring after folding is easily performed to improve the folding reliability of the foldable display device 100.

The plate top may be disposed between the back plate 120 and the plate bottom. The plate top is formed of a material having a high rigidity to supplement the rigidity of the foldable display device 100. Further, when the opening pattern or the groove pattern is formed in the plate bottom, the plate top may minimize the visible recognition of the opening pattern or the groove pattern to the user. For example, the plate top may be formed of a metal material such as stainless steel (SUS), invar, aluminum (Al) series, or magnesium (Mg), but is not limited thereto. As another example, the plate top may also be formed of a plastic material such as polymethylmetacrylate (PMMA), polycarbonate (PC), polyvinylalcohol (PVA), acrylonitrile-butadiene-styrene (ABS), polyethylene terephthalate (PET), silicone, or polyurethane (PU), but is not limited thereto.

The optical control layer 140 is disposed on the flexible display panel 130. The optical control layer 140 uniformly transmits light emitted from the flexible display panel 130 to the outside without lowering a luminance of the foldable display device 100, and absorbs or reflects external light to improve a display quality. For example, the optical control layer 140 may include a polarizer, a lens, a refractor, Phase Retardation/Compensation Films, Prism Films and Light Guide Plates and the like, but is not limited thereto.

The optical control layer 140, the flexible display panel 130, the back plate 120, and the plate assembly 110 may be bonded by adhesive members OCA1, OCA2, and OCA3, respectively. For example, the adhesive members OCA1, OCA2, and OCA3 may be disposed between the optical control layer 140 and the flexible display panel 130, between the flexible display panel 130 and the back plate 120, and between the back plate 120 and the plate assembly 110, respectively.

To improve the degradation of an appearance characteristic due to adhesive contamination or tearing, such as paste leakage, which is generated at the outside of the side surface during the process of manufacturing the foldable display device 100, a laser trimming process may be performed on the optical control layer 140, the flexible display panel 130, and the back plate 120 to remove the part of the outside in which the contamination or defect has occurred.

However, it may be difficult to remove the plate assembly 110 having a relatively higher rigidity by the laser trimming process. Therefore, to avoid the defect, such as adhesive contamination including paste leakage, between the back plate 120 and the plate assembly 110, the adhesive member OCA3 disposed between the back plate 120 and the plate assembly 110 may be located inside compared to the other layers. That is, a side surface of the adhesive member OCA3 disposed between the back plate 120 and the plate assembly 110 may be disposed inside of the side surfaces of the optical control layer 140, the flexible display panel 130, the back plate 120, and the plate assembly 110.

The cover member 150 may be disposed on the optical control layer 140. The cover member 150 protects the flexible display panel 130 and the optical control layer 140 so as not to be damaged by an external impact or deteriorated by foreign materials such as moisture, oxygen, or the like entering from the outside.

The cover member 150 may include a glass 151, a first adhesive layer ADH1, a barrier film 153, and an optional functional layer (not shown).

The glass 151 may be disposed above the optical control layer 140. The glass 151 may be disposed below the barrier film 153 so as not to degrade the folding characteristic while minimizing the damage by the external impact.

The glass 151 may have a specific thickness to ensure the impact resistance without significantly degrading the folding characteristic. For example, the thickness of the glass 151 may be 50 μm to 120 μm (e.g., 85 μm), 70 μm to 120 μm (e.g., 95 μm), 70 μm to 100 μm (e.g., 80 μm), or 80 μm to 100 μm (e.g., 90 μm). In this range, the impact resistance is excellent while maintaining a high folding characteristic of the cover member 150. When the thickness of the glass 151 exceeds 120 μm (e.g., 130 μm), the folding characteristic may be significantly degraded and when the thickness is less than 50 μm (e.g., 30 μm), the impact resistance may be significantly degraded.

A modulus of the glass 151 may be $10^{10}$ Pa to $10^{12}$ Pa (e.g., $10^{11}$ Pa) or $5\times10^{11}$ Pa to $9\times10^{11}$ Pa (e.g., $7\times10^{11}$ Pa). Within this range, it is advantageous in that the impact resistance is excellent while maintaining a high folding characteristic.

A hardness of the glass 151 may be 7 H to 12 H (e.g., 9H) and within this range, the surface hardness of the cover member 150 is excellent and the dent of the cover member 150 during the folding of the foldable display device 100 may be minimized.

The glass 151 may be a chemically strengthened glass. The chemically strengthened glass is a glass which is strengthened by a chemical strengthening method. The chemical strengthening method is a process of enhancing the strength of the glass by an ion exchange method which replaces sodium ions included in the glass with ions having an ion radius larger than that of the sodium ions. Ions having an ion radius larger than that of sodium ions which configure the glass are permeated so that a compressive stress layer is formed on the glass surface to enhance the strength. When the chemically strengthened glass is used as the glass 151, the impact resistance is improved while maintaining a high folding characteristic. Further, it has the advantages of excellent scratch resistance and surface hardness.

The barrier film 153 may be disposed on the glass 151. The barrier film 153 and the glass 151 are bonded by the first adhesive layer ADH1 disposed therebetween. Therefore, the barrier film 153 is disposed on the first adhesive layer ADH1. The first adhesive layer ADH1 will be described below. The barrier film 153 is formed of a polymer material. By doing this, the folding characteristic of the cover member 150 is increased.

For example, the thickness of the barrier film 153 may be 30 μm to 70 μm (e.g., 55 μm), 40 μm to 60 μm (e.g., 50 μm), 30 μm to 55 μm (e.g., 40 μm), 40 μm to 50 μm (e.g., 45 μm), or 55 μm to 70 μm (e.g., 60 μm). Within this range, the folding characteristic is excellent with excellent surface hardness and dent characteristic.

For example, the modulus of the barrier film 153 may be $5\times10^{8}$ Pa to $10^{10}$ Pa (e.g., $10^{9}$ Pa) or $5\times10^{8}$ Pa to $5\times10^{9}$ Pa (e.g., $3\times10^{9}$ Pa). Within this range, the resistance against the external impact may be ensured and the surface hardness is excellent with an excellent dent characteristic.

For example, the Poisson's ratio of the barrier film 153 may be 0.3 to 0.5 (e.g., 0.4). Within this range, the surface hardness, the dent characteristic, and the impact resistance of the cover member 150 may be maintained to be high.

For example, the surface hardness of the barrier film 153 may be 1 H to 4 H (e.g., 3H).

The barrier film 153 may include a polymer base member **153*a* and a hard coating layer 153*b***.

The polymer base member **153*a* may be disposed above the first adhesive layer ADH1. For example, the polymer base member 153*a* may be formed of a material selected from polyimide, polyvinylalcohol (PVA), polymethylmetacrylate (PMMA), polyethylene terephthalate and an acrylic resin. These materials have excellent optical properties of the cover member 150, and may improve folding characteristics while maintaining a high surface hardness of the cover member 150**.

For example, a thickness of the polymer base member **153*a*** may be 30 μm to 60 μm (e.g., 45 μm) or 40 μm to 60 μm (e.g., 50 μm). Within this range, surface hardness and dent characteristic are excellent while folding characteristic is excellent.

The hard coating layer **153*b* may be disposed on the polymer base member 153*a*. The hard coating layer 153*b* increases the surface hardness of the polymer base member 153*a* of which surface hardness is relatively lower than that of the glass 151**.

For example, a thickness of the hard coating layer **153*b* may be 5 μm to 20 μm (e.g., 17 μm), 5 μm to 15 μm (e.g., 15 μm), or 10 μm to 15 μm (e.g., 12 μm). In this range, the surface hardness may be improved while maintaining a high folding characteristic of the cover member 150**.

For example, the hard coating layer 153*b* may include a polymer material, such as a silicon based resin or an epoxy resin, an acrylic resin or glass fiber mesh. In this case, the surface hardness and the appearance quality may be improved while maintaining a high folding characteristic of the cover member 150.

A functional layer may be selectively disposed on the hard coating layer 153*b* if necessary. For example, the functional layer may be one or more layers selected from an abrasion resistant coating layer, an antifouling coating layer, an ultraviolet blocking layer, an antiglare layer, and an antireflection layer, a polarizing layer and the like.

The first adhesive layer ADH1 may be disposed between the barrier film 153 and the glass 151 to bond the barrier film 153 and the glass 151. Therefore, the first adhesive layer ADH1 may be disposed on the glass 151.

For example, the thickness of the first adhesive layer ADH1 may be 5 μm to 10 μm (e.g., 7 μm). Within this range, the thickness of the foldable display device 100 may be maintained to be slim, and the press during the folding may be minimized with excellent folding characteristic of the foldable display device 100. When the thickness of the first adhesive layer ADH1 is smaller than 5 μm (e.g., 3 μm), the first adhesive layer ADH1 does not sufficiently relieve the folding stress applied to the cover member 150 so that the barrier film 153 or the glass 151 may be cracked. Further, when the thickness of the first adhesive layer ADH1 exceeds 10 μm (e.g., 17 μm), the thickness of the foldable display device 100 is increased so that the folding characteristic may be degraded, and the surface hardness is degraded so that the defect by the dent may be caused.

For example, the modulus of the first adhesive layer ADH1 may be $5\times10^4$ Pa to $5\times10^8$ Pa (e.g., $5\times10^6$ Pa), $10^5$ Pa to $5\times10^8$ Pa (e.g., $10^7$ Pa), or $10^5$ Pa to $5\times10^6$ Pa (e.g., $10^6$ Pa). Within this range, both the folding characteristic and the surface hardness characteristic may be satisfied. When the modulus of the first adhesive layer ADH1 is less than $5\times10^4$ Pa, the folding characteristic is excellent, but the surface hardness is degraded so that the defect by the dent during the folding or dent by the pen touch may be easily caused. When the modulus of the first adhesive layer ADH1 exceeds $5\times10^8$ Pa, the folding characteristic is degraded and the stress applied to the cover member 150 during the folding may not be sufficiently relieved.

For example, a ratio of a thickness of the first adhesive layer ADH1 to the thickness of the barrier film 153 may be 1:3 to 1:11 (e.g., 1:6), 1:4 to 1:10 (e.g., 1:7), 1:4 to 1:6 (e.g., 1:5) or 1:7 to 1:11 (e.g., 1:9). Within this range, the surface hardness and the dent characteristic are excellent and the folding characteristic is excellent to easily relieve the stress applied to the glass 151 during the folding.

A decorative layer 152 may be disposed between the glass 151 and the barrier film 153. The decorative layer 152 may be disposed to enclose the outside of the first adhesive layer ADH1. The decorative layer 152 is formed to overlap the non-active area of the flexible display panel 130.

The decorative layer 152 may be formed of a material which absorbs the light. For example, the decorative layer 152 may be formed of a light absorption metal, black dye, carbon black, or black resin. Therefore, the decoration layer 152 does not allow components such as wiring lines disposed in the non-display area to be visible to the outside. Further, the decorative layer 152 covers outsides of the optical control layer 140, the flexible display panel 130, and the back plate 120 to minimize the degradation of the appearance characteristic due to the contamination or tearing of the adhesive members OCA1 and OCA2. Further, the decorative layer 152 serves to suppress the light leakage from the side surface of the foldable display device 100.

For example, a thickness of the decorative layer 152 may be 5 μm to 10 μm (e.g., 7 μm), and desirably, the thickness of the decorative layer 152 may be equal to the thickness of the first adhesive layer ADH1. In this case, the step difference by the decorative layer 152 is covered by the first adhesive layer ADH1. Therefore, there is no need to include a separate over coating layer to cover the step. To cover the step difference, an over coating layer having a low modulus needs to be used. In this case, the surface hardness of the cover member 150 is degraded due to the low modulus of the over coating layer, and when the foldable display device 100 is folded, the dent may occur. As described in the exemplary aspect of the present disclosure, if the thickness of the decorative layer 152 and the thickness of the first adhesive layer ADH1 are applied to be equal, the thickness of the foldable display device 100 is not increased. By doing this, the surface hardness and the dent characteristic are excellent while maintaining a high folding characteristic and the process is simplified.

For example, the first adhesive layer ADH1 may include an optically clear adhesive or an optically clear resin, or an optically clear adhesive tape, but is not limited thereto.

A cover member adhesive layer CW ADH may be disposed between the cover member 150 and the optical control layer 140. The cover member adhesive layer CW ADH bonds the cover member 150 and the optical control layer 140. For example, the cover member adhesive layer CW ADH may include an optically clear adhesive, an optically clear resin, or an optically clear adhesive tape, or a pressure sensitive adhesive, but is not limited thereto.

The cover member 150 may serve to protect layers disposed therebelow from external impact or a contamination source. Therefore, the width of the cover member 150 may be wider than those of the layers disposed therebelow. Therefore, side surfaces of the optical control layer 140, the flexible display panel 130, and the back plate 120 disposed below the cover member 150 may be located inside of the side surface of the cover member 150. The cover member 150 may be larger than the flexible display panel 130 and smaller than the support member 110 in width.

Further, to suppress paste leakage or tearing of the cover member adhesive layer CW ADH, a side surface of the cover member adhesive layer CW ADH may be disposed to be inside of the side surface of the cover member 150. To be more desirable, even though the paste leakage or tearing occurs due to the cover member adhesive layer CW ADH, the side surface of the cover member adhesive layer CW ADH may be located inside of the cover member 150 to overlap at least a part of the decorative layer 152 to be covered by the decorative layer 152.

As illustrated in FIG. 2, the barrier film 153 and the glass 151 which configure the cover member 150 may have the same widths or may also have different widths.

Figure 3:
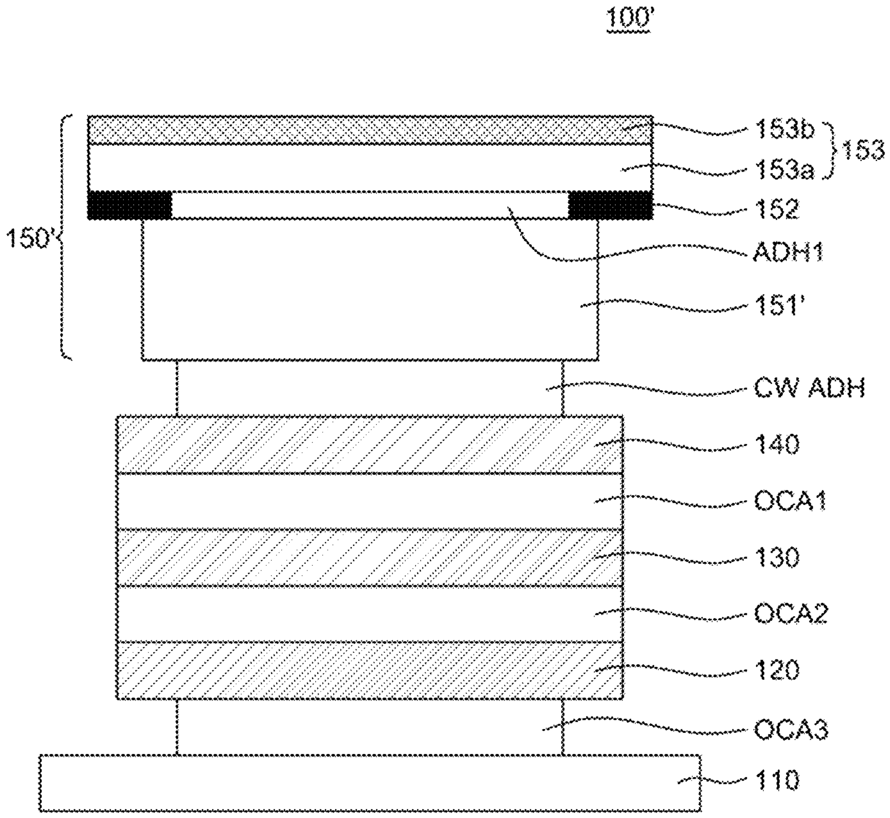
FIG. 3 is a cross-sectional view of a foldable display device according to another exemplary aspect of the present disclosure.

FIG. 3 is a schematic cross-sectional view of a foldable display device according to another exemplary aspect of the present disclosure. Referring to FIG. 3, the width of a glass 151' may be smaller than a width of the barrier film 153. That is, the side surface of the glass 151' may be disposed to be inside of the side surface of the barrier film 153. Further, the side surface of the glass 151' may be located inside of the side surfaces of the flexible display panel 130, the optical control layer 140, and the back plate 120. It may be difficult to perform the laser trimming process on the glass 151' due to the high rigidity. Therefore, it is difficult to remove the outer part by the laser trimming process, as illustrated in FIG. 3, a glass 151' which is smaller than the barrier film 153 may also be used.

The foldable display device 100 according to the exemplary aspect of the present disclosure includes a cover member 150'. The cover member 150' includes a glass 151' disposed at a lower portion thereof, a barrier film 153 of a polymer material disposed at an upper portion thereof, and a first adhesive layer ADH1 disposed therebetween. A modulus of the first adhesive layer ADH1 is $5\times10^4$ Pa to $5\times10^8$ Pa (e.g., $5\times10^6$ Pa). The thickness of the barrier film 153 is 30 μm to 70 μm (e.g., 50 μm) and a ratio of the thickness of the first adhesive layer ADH1 to the thickness of the barrier film 153 is 1:4 to 1:10 (e.g., 1:7). Therefore, the surface hardness and the impact resistance may be simultaneously satisfied with the excellent folding characteristic.

Figure 4:
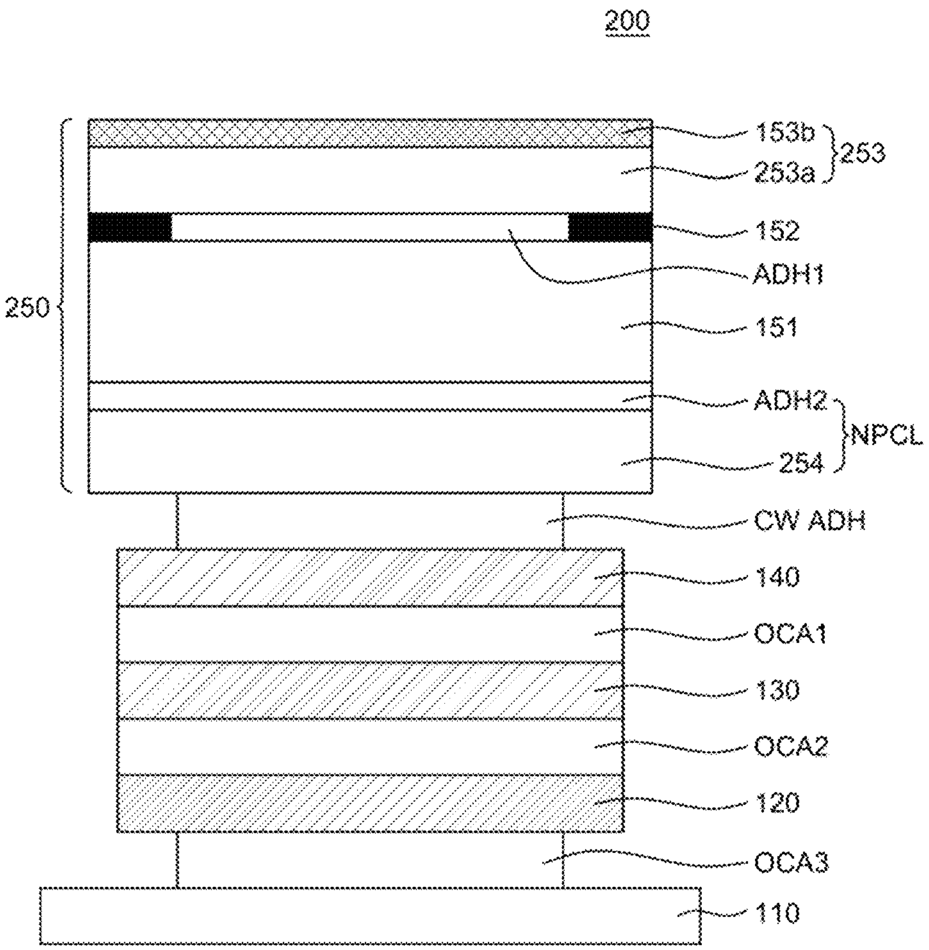
FIG. 4 is a cross-sectional view of a foldable display device according to still another exemplary aspect of the present disclosure.

FIG. 4 is a cross-sectional view of a foldable display device according to another exemplary aspect of the present disclosure. Referring to FIG. 4, the foldable display device 200 according to another exemplary aspect of the present disclosure may include a plate assembly 110, a back plate 120, a flexible display panel 130, an optical control layer 140, and a cover member 250. The cover member 250 includes a glass 151, a first adhesive layer ADH1, a barrier film 253, and a neutral plane compensation layer NPCL, and the neutral plane compensation layer NPCL includes a second adhesive layer ADH2 and a buffer layer 254. Components of the foldable display device 200 illustrated in FIG. 4 are substantially the same as those of the foldable display device 100 illustrated in FIG. 2 except that a thickness ratio of the first adhesive layer and the barrier film is different and the second adhesive layer and the neutral plane compensation layer are further included. Therefore, a description of repeated components will be omitted.

Referring to FIG. 4, the cover member 250 may include the neutral plane compensation layer NPCL disposed below the glass 151. The glass 151 is not easy to relieve the tensile stress due to the characteristic of the material itself. The neutral plane compensation layer NPCL may be disposed below the glass 151 to move the strain applied to the glass 151 to a compressed direction when the foldable display device 200 is folded. Therefore, when the foldable display device 200 is folded, the tensile stress applied to the glass 151 is relieved to suppress the breakage of the glass 151. Therefore, the folding characteristic of the cover member 250 may be further improved.

When the thickness of the barrier film 253 is relatively thick or the thickness of the first adhesive layer ADH1 is relatively thin, a stronger tensile stress may be applied to the glass 151. In this case, the neutral plane compensation layer NPCL easily relives the tensile stress applied to the glass 151 to suppress the breakage of the glass. That is, the foldable display device 200 including the neutral plane compensation layer NPCL has more excellent folding characteristic so that even though the thickness of the barrier film 253 is increased, the breakage of the glass 151 may be minimized. When the thickness of the barrier film 253 is increased as described above, it is advantageous in that the dent characteristic and the surface hardness are relatively excellent. Accordingly, the foldable display device 200 including the neutral plane compensation layer NPCL has excellent folding characteristic, surface hardness, and dent characteristic.

For example, the thickness of the barrier film 253 may be 45 μm to 70 μm (e.g., 55 μm), 55 μm to 70 μm (e.g., 65 μm), or 55 μm to 65 μm (e.g., 60 μm). As described above, even though the thickness of the barrier film 253 is relatively thick, the folding characteristic is improved by the neutral plane compensation layer NPCL to suppress the breakage of the glass 151 and to improve the dent rigidity of the cover member 250.

A ratio of a thickness of the first adhesive layer ADH1 to a thickness of the barrier film 253 may be 1:10 to 1:14 (e.g., 1:12) or 1:11 to 1:14 (e.g., 1:13). As described above, even though the thickness of the barrier film 253 is relatively thick compared to the first adhesive layer ADH1, the folding characteristic is improved by the neutral plane compensation layer NPCL. Therefore, the stress applied to the glass 151 during the folding may be easily relieved and the surface hardness and the dent rigidity are improved.

The neutral plane compensation layer NPCL includes a buffer layer 254 and a second adhesive layer ADH2.

The buffer layer 254 is disposed between the glass 151 and the cover member adhesive layer CW ADH. The buffer layer 254 may be formed of a material selected from polyimide, polyvinylalcohol (PVA), polymethylmetacrylate (PMMA), polyethylene terephthalate and an acrylic resin, but is not limited thereto. These materials have excellent optical characteristic and folding characteristic and may easily relive the stress applied to the glass 151.

For example, a thickness of the buffer layer 254 may be 30 μm to 70 μm (e.g., 55 μm), 30 μm to 60 μm (e.g., 45 μm), or 40 μm to 60 μm (e.g., 50 μm). When the thickness of the buffer 254 is less than 30 μm, the improvement effect of the surface hardness may be insignificant and it may be difficult to sufficiently relieve the tensile stress applied to the glass 151. When the thickness of the buffer layer 254 exceeds 70 μm, the folding characteristic may be degraded. Specifically, when the thickness of the barrier film 253 is increased or the modulus of the first adhesive layer ADH1 is increased, the tensile stress applied to the glass 151 is further increased so that a crack may occur in the glass 151.

For example, the modulus of the buffer layer 254 may be $5\times10^7$ Pa to $5\times10^9$ Pa (e.g., $5\times10^8$ Pa), $10^8$ Pa to $5\times10^{10}$ Pa (e.g., $10^9$ Pa), or $10^8$ Pa to $5\times10^8$ Pa (e.g., $3\times10^8$ Pa). In this case, the stress applied to the glass 151 during the folding of the foldable display device 200 may be easily relieved with the excellent surface hardness and dent characteristic of the cover member 250.

The second adhesive layer ADH2 is disposed between the buffer layer 254 and the glass 151. The second adhesive layer ADH2 bonds the buffer layer 254 and the glass 151.

For example, the thickness of the second adhesive layer ADH2 may be 5 μm to 10 μm (e.g., 7 μm). Within this range, the thickness of the foldable display device 200 may be maintained to be slim, and the press during the folding may be minimized with excellent folding characteristic of the foldable display device 200. When the thickness of the second adhesive layer ADH2 is less than 5 μm, the folding stress may not be sufficiently relieved and when the thickness exceeds 10 μm, the thickness of the foldable display device 200 is increased so that the folding characteristic may be degraded and the surface hardness may be degraded.

For example, the modulus of the second adhesive layer ADH2 may be $5\times10^4$ Pa to $5\times10^8$ Pa (e.g., $5\times10^6$ Pa) or $10^5$ Pa to $5\times10^6$ Pa (e.g., $10^6$ Pa). Within this range, the folding characteristic of the foldable display device 200 is excellent and the surface hardness is excellent.

The cover member 250 may be larger than the layers disposed therebelow to protect the layers disposed therebelow from the external impact or the contamination source. Therefore, side surfaces of the optical control layer 140, the flexible display panel 130, and the back plate 120 disposed below the cover member 250 may be located inside of the side surface of the cover member 250. The cover member 250 may be larger than the flexible display panel 130 and smaller than the support member 110 in width.

As illustrated in FIG. 4, the barrier film 253, the glass 151, and the neutral plane compensation layer NPCL which configure the cover member 250 may have the same width, but are not limited thereto.

Figure 5:
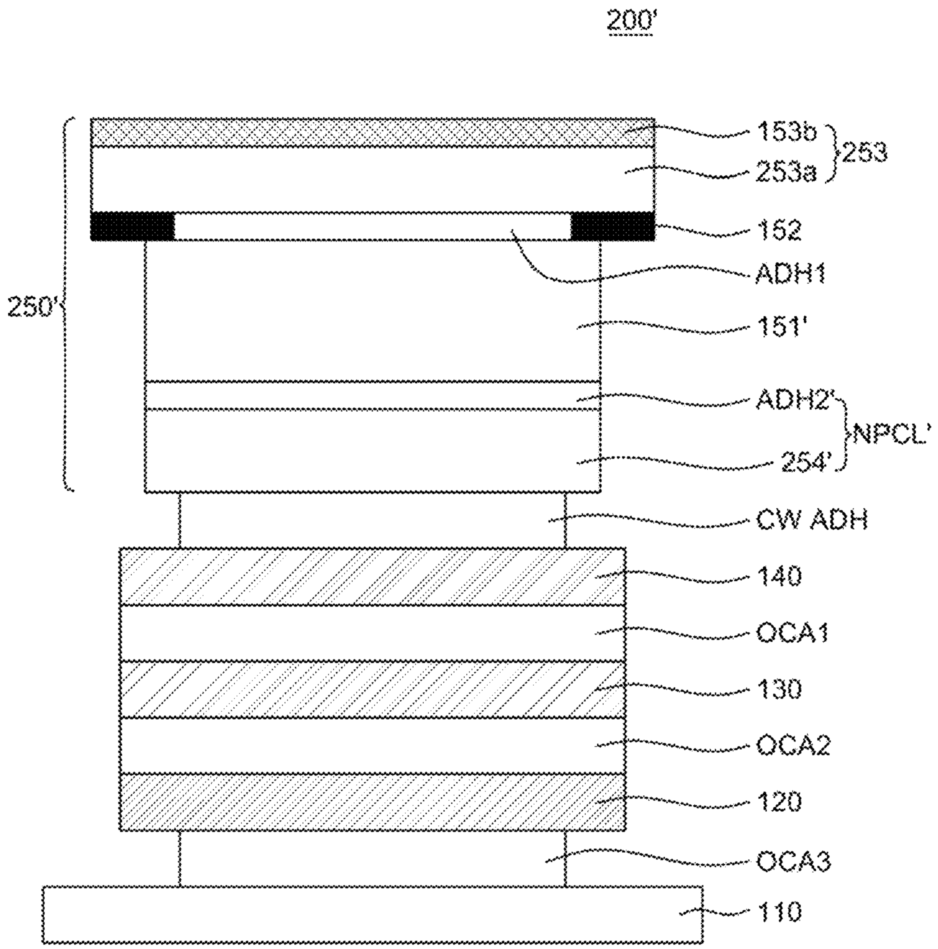
FIG. 5 is a cross-sectional view of a foldable display device according to further another exemplary aspect of the present disclosure.

FIG. 5 is a schematic cross-sectional view of a foldable display device according to still another exemplary aspect of the present disclosure. Referring to FIG. 5, the widths of a glass 151' and the neutral plane compensation layer NPCL' may be smaller than a width of the barrier film 253. That is, the side surfaces of the glass 151' and the side surface of the neutral plane compensation layer NPCL' may be disposed to be inside of the side surface of the barrier film 253. It may be difficult to perform the laser trimming process on the glass 151' due to the high rigidity. Therefore, it is difficult to remove the outer part by the laser trimming process, as illustrated in FIG. 5, a glass 151' which is smaller than the barrier film 253 may also be used.

The foldable display device 200 according to the present disclosure includes a cover member 250'. The cover member 250' includes a glass 151' disposed at a lower portion thereof, a barrier film 253 formed of a polymer material disposed at an upper portion thereof, and a first adhesive layer ADH1 disposed therebetween. Further, the cover member 250' includes a neutral plane compensation layer NPCL' including a buffer layer 254' disposed at a lower portion thereof and a second adhesive layer ADH2' which bonds the glass 151' and the buffer layer 254'. At this time, the moduli of the first adhesive layer ADH1 and the second adhesive layer ADH2' may be $5\times10^4$ Pa to $5\times10^9$ Pa (e.g., $5\times10^7$ Pa), the thickness of the barrier film 253 is 45 μm to 70 μm (e.g., 50 μm), and the thickness ratio of the first adhesive layer ADH1 to the barrier film 253 may be 1:10 to 1:14 (e.g., 1:12). Accordingly, the foldable display device 200 according to the present disclosure has excellent folding characteristic and excellent surface hardness and impact resistance. Specifically, even though the thickness of the barrier film 253 is increased by the neutral plane compensation layer NPCL or the thickness of the first adhesive layer ADH1 is relatively thin, the tensile stress applied to the glass 151' is easily relieved to improve the folding characteristic. Further, the surface hardness and the dent characteristic are further excellent.

Hereinafter, the effects of the present disclosure will be described in more detail with reference to Embodiments. However, the following Embodiments are set forth to illustrate the present disclosure, but the scope of the disclosure is not limited thereto.

[Aspect 1]

A transparent polyimide film with a thickness of 30 μm was prepared and a hard coating layer with a thickness of 10 μm was formed on the transparent polyimide film. The transparent film produced as described above and a glass with a thickness of 90 μm were bonded by an adhesive layer ADH1 with a thickness of 5 μm having a modulus of $10^5$ Pa to produce the cover member. The cover member produced as described above was in-folded to have a radius of curvature of 5R (a radius of curved surface of 5 mm).

[Aspect 2]

The same cover member as Aspect 1 was prepared except that a transparent polyimide film with a thickness of 40 μm was used.

[Aspect 3]

The same cover member as Aspect 1 was prepared except that a thickness of an adhesive layer was changed to 10 μm.

[Aspect 4]

The same cover member as Aspect 2 was prepared except that a thickness of an adhesive layer was changed to 10 μm.

[Aspect 5]

The same cover member as Aspect 1 was prepared except that a transparent polyimide film with a thickness of 50 μm was used and a thickness of an adhesive layer ADH1 was changed to 10 μm.

[Aspect 6]

The same cover member as Aspect 1 was prepared except that an adhesive layer ADH1 having a modulus of $10^8$ Pa and a thickness of 5 μm was used.

[Aspect 7]

The same cover member as Aspect 2 was prepared except that an adhesive layer ADH1 having a modulus of $10^8$ Pa and a thickness of 5 μm was used.

[Aspect 8]

A transparent polyimide film with a thickness of 50 μm was prepared and a hard coating layer with a thickness of 10 μm was formed on the transparent polyimide film. The transparent film produced as described above and a glass with a thickness of 90 μm were bonded by an adhesive layer ADH1 with a modulus of $10^5$ Pa and a thickness of 5 μm. A buffer layer BL with a modulus of $5\times10^5$ Pa and a thickness of 5 μm was prepared. A cover member including a neutral plane compensation layer was produced by bonding the glass and the buffer layer using an adhesive layer ADH2 with a modulus of $10^5$ Pa and a thickness of 5 μm. The cover member produced as described above was in-folded to have a radius of curvature of 5R (a radius of curved surface of 5 mm).

[Aspect 9]

The same cover member as Aspect 1 was prepared except that an adhesive layer ADH1 having a modulus of $10^6$ Pa was used.

[Aspect 10]

The same cover member as Aspect 2 was prepared except that an adhesive layer ADH1 having a modulus of $10^6$ Pa was used.

[Aspect 11]

The same cover member as Aspect 3 was prepared except that an adhesive layer ADH1 having a modulus of $10^6$ Pa was used.

[Aspect 12]

The same cover member as Aspect 4 was prepared except that an adhesive layer ADH1 having a modulus of $10^6$ Pa was used.

[Aspect 13]

The same cover member as Aspect 5 was prepared except that an adhesive layer ADH1 having a modulus of $10^6$ Pa was used.

Comparative Example 1

A polyethylene terephthalate film with a thickness of 50 μm was prepared and a hard coating layer with a thickness of 10 μm was formed on the polyethylene terephthalate film. The polyethylene terephthalate film produced as described above and a glass with a thickness of 30 μm were bonded by an adhesive layer ADH1 with a modulus of $10^4$ Pa and a thickness of 25 μm to produce the cover member. The cover member produced as described above was in-folded to have a radius of curvature of 5R (a radius of curved surface of 5 mm).

Comparative Example 2

The same cover member as Aspect 1 was prepared except that an adhesive layer ADH1 having a modulus of $10^4$ Pa and a thickness of 5 μm was used.

Comparative Example 3

The same cover member as Aspect 2 was prepared except that an adhesive layer ADH1 having a modulus of $10^4$ Pa and a thickness of 5 μm was used.

Comparative Example 4

The same cover member as Aspect 1 was prepared except that a transparent polyimide film with a thickness of 50 μm was used.

Comparative Example 5

The same cover member as Aspect 1 was prepared except that a transparent polyimide film with a thickness of 80 μm was used.

Comparative Example 6

The same cover member as Aspect 3 was prepared except that a transparent polyimide film with a thickness of 80 μm was used.

Comparative Example 7

The same cover member as Aspect 1 was prepared except that an adhesive layer ADH1 having a modulus of $10^5$ Pa and a thickness of 25 μm was used.

Comparative Example 8

The same cover member as Aspect 2 was prepared except that an adhesive layer ADH1 having a modulus of $10^5$ Pa and a thickness of 25 μm was used.

Comparative Example 9

The same cover member as Aspect 1 was prepared except that a transparent polyimide film of a thickness of 50 μm and an adhesive layer ADH1 having a modulus of $10^5$ Pa and a thickness of 25 μm were used.

Comparative Example 10

The same cover member as Aspect 1 was prepared except that an adhesive layer ADH1 having a modulus of $10^6$ Pa and a thickness of 5 μm and a transparent polyimide film of a thickness of 50 μm were used.

Comparative Example 11

The same cover member as Aspect 1 was prepared except that an adhesive layer ADH1 having a modulus of $10^6$ Pa and a thickness of 5 μm and a transparent polyimide film of a thickness of 80 μm were used.

Comparative Example 12

The same cover member as Aspect 1 was prepared except that an adhesive layer ADH1 having a modulus of $10^6$ Pa and a thickness of 10 μm and a transparent polyimide film of a thickness of 80 μm were used.

Experimental Example 1

A pencil hardness, a dent characteristic, a folding strain, a static folding characteristic, and a dynamic folding characteristic of the cover member produced according to Embodiments 1 to 5 and Comparative Examples 1 to 6 were evaluated as follows.

1. Pencil Hardness

A surface of a specimen was scratched with a pencil under the condition of an angle of 45° and a speed of 300 mm/min while applying a load of 750 gf to the specimen and then whether the surface was scratched was observed with the naked eye.

2. Dent Characteristic

After pressing a specimen for 1 minute while applying a load of 750 gf with a pencil, it was left for 24 hours. After 24 hours, scratches or whether the specimen is dented was observed with the naked eye.

3. Folding Strain

A simulation was performed under a condition of a radius of curvature of 5R and a room temperature using a simulation program to analyze the folding strain of each specimen. A negative (−) measurement value meant that a compressive strain was relatively largely applied and a positive meant that the tensile strain was relatively largely applied.

4. Static Folding Characteristic

A folded specimen (a radius of curvature of 5R and in-folded) was left in a constant temperature and humidity chamber at a temperature of 65° C. and a relative humidity of 90% for 528 hours, and then cracks or peeling were observed.

5. Dynamic Folding Characteristic

After repeating the process of folding and unfolding the specimen 100000 times under conditions of a temperature of 65° C. and relative humidity of 90% using bending test equipment, cracks or peeling were observed.

6. Low Temperature Dynamic Folding Characteristic

After repeating the process of folding and unfolding the specimen 100000 times at −20° ° C., cracks or peeling were observed.

The results thereof were filled in the following Tables 1 and 2.

TABLE 1

| | Aspects | | | | |
|---|---|---|---|---|---|
| | 1 | 2 | 3 | 4 | 5 |
| BF thickness (μm) | 40 | 50 | 40 | 50 | 60 |
| ADH1 thickness (μm) | 5 | 5 | 10 | 10 | 10 |
| ADH1 modulus (Pa) | 105 | 105 | 105 | 105 | 105 |
| GLS thickness (μm) | 90 | 90 | 90 | 90 | 90 |
| Thickness ratio of ADH1:BF | 1:8 | 1:10 | 1:4 | 1:5 | 1:6 |

TABLE 1-continued

| | | Aspects | | | | |
|---|---|---|---|---|---|---|
| | | 1 | 2 | 3 | 4 | 5 |
| Pencil hardness | | 3H | 4H | 2H | 3H | 4H |
| Dent characteristic | | No dent | No dent | No dent | No dent | No dent |
| Strain (%) | HC upper portion | (—) 0.5874 | (—) 0.6385 | (—) 0.5548 | (—) 0.5960 | (—) 0.6360 |
| | GLS lower portion | 0.4687 | 0.4734 | 0.4671 | 0.4708 | 0.4743 |
| Static folding characteristic (65° C./90%) | | OK | OK | OK | OK | OK |
| Dynamic folding characteristic (65° C./90%) | | OK | OK | OK | OK | OK |
| Dynamic folding characteristic (−20° C.) | | OK | OK | OK | OK | OK |

(BF: Barrier film, HC: Hard coating layer, GLS: Glass)

TABLE 2

| | | Comparative Examples | | | | | |
|---|---|---|---|---|---|---|---|
| | | 1 | 2 | 3 | 4 | 5 | 6 |
| BF thickness (μm) | | 60 | 40 | 50 | 60 | 90 | 90 |
| ADH1 thickness (μm) | | 25 | 5 | 5 | 5 | 5 | 10 |
| ADH1 modulus (Pa) | | 104 | 104 | 104 | 105 | 105 | $10^5$ |
| GLS thickness (μm) | | 30 | 90 | 90 | 90 | 90 | 90 |
| Thickness ratio of ADH1:BF | | 1:2.4 | 1:8 | 1:10 | 1:12 | 1:18 | 1:9 |
| Pencil hardness | | HB | 2H | 3H | 6H | 6H | 5H |
| Dent characteristic | | 6B | No dent | No dent | No dent | No dent | No dent |
| Strain (%) | HC upper portion | (—) 0.4790 | (—) 0.4445 | (—) 0.4795 | (—) 0.6872 | (—) 0.8251 | (—) 0.7547 |
| | GLS lower portion | 0.1798 | 0.4617 | 0.4638 | 0.4780 | 0.4906 | 0.4830 |
| Static folding characteristic (65° C./90%) | | OK | OK | OK | NG | NG | NG |
| Dynamic folding characteristic (65° C./90%) | | OK | OK | OK | NG | NG | NG |
| Dynamic folding characteristic (−20° C.) | | OK | OK | OK | NG | NG | NG |

(BF: Barrier film, HC: Hard coating layer, GLS: Glass)

Referring to the above Tables 1 and 2, in Comparative Examples 1 to 3 in which an adhesive layer having a low modulus of $10^4$ Pa is used, it may be confirmed that the surface hardness is low. Specifically, when Aspect 1 and Comparative Example 2 having the same condition except for a modulus of the adhesive layer are compared, it may be confirmed that the surface hardness of Comparative Example 2 is lower compared to that of Aspect 1. Further, when Aspect 2 and Comparative Example 3 having the same condition except for a modulus of the adhesive layer are compared, it may be confirmed that the surface hardness of Comparative Example 3 is lower compared to that of Aspect 2. Further, in the case of Comparative Example 1 using a thin glass with a thickness of 30 μm and a thick adhesive layer with a low modulus and a thickness of 25 μm, it may be confirmed that not only the surface hardness but also the dent characteristic is inferior.

In contrast, it may be confirmed that Embodiments 1 to 5 in which a glass is thick with a thickness of 90 μm, a thickness of a barrier film is 40 μm to 60 μm, and an adhesive layer has a high modulus of $10^5$ Pa and a thickness of 5 μm or 10 μm have all excellent surface hardness and dent characteristic. Further, a strain applied to a lower portion of the glass is low and the folding characteristic is satisfied under various conditions.

In the case of Comparative Examples 5 and 6 with the same conditions as Embodiments 1 to 5 except for the thick barrier film with a thickness of 90 μm, it may be confirmed that a strain applied to the lower portion of the glass is high and the folding characteristics which is performed using three different conditions are not satisfied.

Further, it may be confirmed that Embodiments 1 to 5 in which a ratio of the thickness of the first adhesive layer to a thickness of the barrier film is 1:4 to 1:10 have all excellent surface hardness, dent characteristic, and folding characteristic. However, it may be confirmed that Comparative Example 4 in which a ratio of the thickness of the first adhesive layer to a thickness of the barrier film is 1:12 has excellent surface hardness and dent characteristic, but has inferior folding characteristic.

Aspect 1, Comparative Example 4, and Aspect 5 have the same conditions that the modulus of the first adhesive layer is $10^5$ Pa and the thickness of the glass is 90 μm. When the results thereof are compared, it may be confirmed that, in the case of Comparative Example 4 having a large ratio of the thickness of the first adhesive layer to a thickness of the barrier film of 1:12, as compared with Embodiments 1 and 5 with a thickness ratio of 1:8 and 1:6, respectively, a strain applied to the lower portion of the glass is large so that the folding characteristic is not satisfied. Therefore, it may be understood that the larger the thickness of the barrier film and the smaller the thickness of the first adhesive layer, the larger the strain applied to the lower portion of the glass so that the folding characteristic is inferior.

Experimental Example 2

A pencil hardness, a dent characteristic, a folding strain, a static folding characteristic, and a dynamic folding characteristic of the cover member produced according to Embodiments 1, 2, 6, and 7 and Comparative Examples 7 and 8 were evaluated by the same manner as Aspect 1. The result thereof was filled in the following Table 3.

As compared with the results of Embodiments 1, 2, 6 and 7, when the ratio of the thickness of the first adhesive layer to the thickness of the barrier film is 1:8 to 1:10, even though the modulus of the first adhesive layer is significantly increased to $10^8$ Pa, the strain applied to the lower portion of the glass is not significantly increased. Therefore, it may be confirmed that the surface hardness is further improved while satisfying the folding characteristic.

Experimental Example 3

A pencil hardness, a dent characteristic, a dent stress characteristic, a folding strain and a dynamic folding characteristic of the cover member produced according to Embodiments 2, 5, and 8 and Comparative Examples 4 and 9 were evaluated by the same manner as Aspect 1. Further, the impact resistance characteristic was evaluated by the following manner.

TABLE 3

| | | Aspect 1 | Aspect 2 | Aspect 6 | Aspect 7 | Com. Ex. 7 | Com. Ex. 8 |
|---|---|---|---|---|---|---|---|
| BF thickness (μm) | | 40 | 50 | 40 | 50 | 40 | 50 |
| ADH1 thickness (μm) | | 5 | 5 | 5 | 5 | 25 | 25 |
| ADH1 modulus (Pa) | | 105 | 105 | 108 | 108 | 105 | 105 |
| GLS thickness (μm) | | 90 | 90 | 90 | 90 | 90 | 90 |
| Thickness ratio of ADH1:BF | | 1:8 | 1:10 | 1:8 | 1:10 | 1:1.6 | 1:2 |
| Pencil hardness | | 3H | 4H | 4H | 5H | HB | F |
| Dent characteristic | | No dent | No dent | No dent | No dent | 2B | B |
| Strain(%) | HC upper portion | (—) 0.5874 | (—) 0.6385 | (—) 0.8603 | (—) 0.9488 | (—) 0.5527 | (—) 0.5776 |
| | GLS lower portion | 0.4687 | 0.4734 | 0.4702 | 0.4743 | 0.4670 | 0.4697 |
| Static folding characteristic (65° C./90%) | | OK | OK | OK | OK | OK | OK |
| Dynamic folding characteristic (65° C./90%) | | OK | OK | OK | OK | OK | OK |
| Dynamic folding characteristic (−20° C.) | | OK | OK | OK | OK | OK | OK |

(BF: Barrier film, HC: Hard coating layer, GLS: Glass)

Referring to Table 3, Embodiments 1 and 2 have excellent surface hardness and dent characteristic, but a strain applied to a lower portion of the glass is small to satisfy all the folding characteristics.

However, in the case of Comparative Examples 7 and 8 in which the thickness of the first adhesive layer is 25 μm so that a ratio of the thickness of the first adhesive layer to a thickness of the barrier film is 1:1.6 or 1:2, respectively, with the other conditions being the same as those of Embodiments 1 and 2, the modulus of the first adhesive layer is high of $10^5$ Pa. however, the surface hardness is HB and F which are significantly inferior to Embodiments and the dent characteristic is also 2B or B level which is inferior.

Dent stress characteristic: The stress analyzer (Instron Inc.) was used to press a tip with a diameter of 0.5 mm with a load of 2 kgf at a speed of 2 mm/min, and a diameter of the dent mark was measured with an optical microscope.

The result thereof was filled in the following Table 4.

TABLE 4

| | Aspect 2 | Aspect 5 | Aspect 8 | Comparative Example 4 | Comparative Example 9 |
|---|---|---|---|---|---|
| BF thickness (μm) | 50 | 60 | 60 | 60 | 60 |
| ADH1 thickness (μm) | 5 | 10 | 5 | 5 | 25 |
| ADH1 modulus (Pa) | $10^5$ | $10^5$ | $10^5$ | $10^5$ | $10^5$ |
| GLS thickness (μm) | 90 | 90 | 90 | 90 | 90 |
| Thickness ratio of ADH1:BF | 1:10 | 1:6 | 1:12 | 1:12 | 1:2.4 |
| ADH2 thickness (μm)/modulus (Pa) | — | — | 5/$10^5$ | — | — |
| BL thickness (μm)/modulus (Pa) | — | — | 40/5*$10^9$ | — | — |
| Pencil hardness | 4H | 4H | 6H | 6H | 3H |
| Dent characteristic | No dent | No dent | No dent | No dent | 6B |
| Dent stress characteristic(μm) | 105 | 185 | 63 | 85 | 200 |
| GLS lower strain (%) | 0.4734 | 0.4743 | 0.4693 | 0.4780 | 0.4720 |
| Dynamic folding characteristic (−20° C.) | OK | OK | OK | NG | OK |

(BF: Barrier film, HC: Hard coating layer, GLS: Glass, BL: Buffer layer)

Referring to Table 4, in Embodiments 2, 5, and 8 and Comparative Examples 4 and 9, the modulus of the first adhesive layer is $10^5$ Pa and the thickness of the glass is the same as 90 μm. At this time, in the case of Comparative Example 9 having a ratio of the thickness of the first adhesive layer to the thickness of the barrier film of 1:2.4, the thickness ratio of the first adhesive layer is high so that the dent characteristic and the dent stress characteristic are the most inferior.

In contrast, it may be confirmed that Embodiments 2 and 5 having ratios of the thickness of the first adhesive layer to the thickness of the barrier film of 1:10 and 1:6, respectively, as compared with Comparative Example 9, a strain applied to the lower portion of the glass is not significantly increased with excellent surface hardness, dent characteristic, and the dent stress characteristic. Therefore, the folding characteristic is satisfied.

In the case of Comparative Example 4 having a ratio of the thickness of the first adhesive layer to the thickness of the barrier film of 1:12, the surface hardness, the dent characteristic, and the dent stress characteristic are excellent. However, a significant strain is applied to the lower portion of the glass so that the folding characteristic is not satisfied.

Similar to Comparative Example 4, it may be confirmed that Aspect 8 has the same ratio of the thickness of the first adhesive layer to the thickness of the barrier film of 1:12, but the surface hardness, the dent characteristic, and the dent stress characteristic are excellent and the strain applied to the lower portion is reduced compared to that of Comparative Example 4 to satisfy the folding characteristic. By doing this, it may be understood that when the ratio of the thickness of the first adhesive layer to the thickness of the barrier film is 1:12 so that the thickness ratio of the barrier film is significantly large, the neutral plane compensation layer including a second adhesive layer and a buffer layer is equipped. By doing this, it may be understood that the strain applied to the lower portion of the glass is reduced while maintaining a significantly high surface hardness and dent characteristic to significantly improve the folding characteristic.

Experimental Example 4

A pencil hardness, a dent characteristic, a folding strain, a static folding characteristic, and a dynamic folding characteristic of the cover member produced according to Embodiments 9 to 13 and Comparative Examples 10 to 12 were evaluated by the same manner as Aspect 1. The result thereof was filled in the following Table 5.

TABLE 5

| | | Aspect 9 | Aspect 10 | Aspect 11 | Aspect 12 | Aspect 13 | Comp. Ex. 10 | Comp. Ex. 11 | Comp. Ex. 12 |
|---|---|---|---|---|---|---|---|---|---|
| BF thickness (μm) | | 40 | 50 | 40 | 50 | 60 | 60 | 90 | 90 |
| ADH1 thickness (μm) | | 5 | 5 | 10 | 10 | 10 | 5 | 5 | 10 |
| ADH1 modulus (Pa) | | 106 | 106 | 106 | 106 | 106 | 106 | 106 | 106 |
| GLS thickness (μm) | | 90 | 90 | 90 | 90 | 90 | 90 | 90 | 90 |
| Thickness ratio of ADH1:BF | | 1:8 | 1:10 | 1:4 | 1:5 | 1:6 | 1:12 | 1:18 | 1:9 |
| Pencil hardness | | 3H | 4H | 2H | 3H | 4H | 6H | 6H | 5H |
| Dent characteristic | | No dent | No dent | No dent | No dent | No dent | No dent | No dent | No dent |
| Strain (%) | HC upper portion | (—) 0.7626 | (—) 0.8351 | (—) 0.7617 | (—) 0.8263 | (—) 0.8882 | (—) 0.9050 | (—) 1.1015 | (—) 1.0608 |
| | GLS lower portion | 0.4691 | 0.4737 | 0.4685 | 0.4713 | 0.4768 | 0.4802 | 0.4934 | 0.4879 |
| Static folding characteristic (65° C./90%) | | OK | OK | OK | OK | OK | NG | NG | NG |
| Dynamic folding characteristic (65° C./90%) | | OK | OK | OK | OK | OK | NG | NG | NG |
| Dynamic folding characteristic (−20° C.) | | OK | OK | OK | OK | OK | NG | NG | NG |

(BF: Barrier film, HC: Hard coating layer, GLS: Glass)

Referring to Table 5, it may be confirmed that Embodiments 9 to 13 using a thick glass with a thickness of 90 μm, a barrier film with a thickness of 40 μm to 60 μm, and an adhesive layer with a high modulus of $10^6$ Pa and a thickness of 5 μm or 10 μm have all excellent surface hardness and dent characteristic. Further, a strain applied to a lower portion of the glass is low and the folding characteristic is satisfied under various conditions.

In the case of Comparative Examples 11 and 12 with the same conditions as Embodiments 9 to 13 except for the thick barrier film with a thickness of 90 μm, it may be confirmed that a strain applied to the lower portion of the glass is significantly high and the folding characteristic under three different conditions is not satisfied.

Further, it may be confirmed that Aspects 9 to 13 in which a ratio of the thickness of the first adhesive layer to a thickness of the barrier film is 1:4 to 1:10 have all excellent surface hardness, dent characteristic, and folding characteristic. However, it may be confirmed that Comparative Example 10 in which a ratio of the thickness of the first adhesive layer to a thickness of the barrier film is 1:12 has the same thickness of the barrier film as Aspect 13, but the folding characteristic is significantly inferior.

The exemplary embodiments of the present disclosure may also be described as follows:

According to an aspect of the present disclosure, a foldable display device comprises a flexible display panel; a support member disposed below the flexible display panel; and a cover member disposed on the flexible display panel, wherein the cover member includes: a glass disposed on the flexible display panel; a first adhesive layer disposed on the glass; and a barrier film disposed on the first adhesive layer, and a thickness of the barrier film is 30 μm to 70 μm, a thickness of the first adhesive layer is 5 μm to 10 μm, and a modulus of the first adhesive layer is $5\times10^4$ Pa to $5\times10^8$ Pa.

A ratio of a thickness of the first adhesive layer to a thickness of the barrier film may be 1:4 to 1:10.

A modulus of the barrier film may be $5\times10^8$ Pa to $10^{10}$ Pa, and a Poisson's ratio of the barrier film may be 0.3 to 0.5.

A thickness of the glass may be 70 μm to 120 μm and a modulus of the glass may be $10^{10}$ Pa to $10^{12}$ Pa.

The barrier film may include a polymer substrate disposed on the first adhesive layer and a hard coating layer disposed on the polymer substrate.

The cover member may be disposed between the glass and the barrier film, may further include a decorative layer which is disposed to enclose the outer portion of the first adhesive layer, and a thickness of the decorative layer may be equal to a thickness of the first adhesive layer.

A thickness of the barrier film may be 45 μm to 70 μm and a ratio of the thickness of the first adhesive layer to the thickness of the barrier film may be 1:10 to 1:14, the cover member may further include a neutral plane compensation layer disposed below the glass, and the neutral plane compensation layer may include a buffer layer and a second adhesive layer disposed between the buffer layer and the glass.

A thickness of the buffer layer may be 30 μm to 70 μm and a modulus of the buffer layer may be $5\times10^7$ Pa to $5\times10^{10}$ Pa.

A thickness of the second adhesive layer may be 5 μm to 10 μm and a modulus of the second adhesive layer may be $5\times10^4$ Pa to $5\times10^8$ Pa.

The foldable display device may further comprise a cover member adhesive layer disposed between the cover member and the flexible display panel, wherein a side surface of the cover member adhesive layer may be located inside of a side surface of the flexible display panel and a side surface of the cover member.

A side surface of the flexible display panel may be located inside of a side surface of the cover member.

A side surface of the glass and a side surface of the first adhesive layer may be located inside of the side surface of the barrier film.

The foldable display device may further comprise an adhesive member disposed between the flexible display panel and the support member, wherein a side surface of the adhesive layer may be located inside of a side surface of the flexible display panel and a side surface of the support member.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A foldable display device, comprising:

a flexible display panel;

a support member disposed below the flexible display panel; and a cover member disposed above the flexible display panel, wherein the cover member includes:

a glass disposed above the flexible display panel;

a first adhesive layer disposed above the glass; and a barrier film disposed above the first adhesive layer, wherein a ratio of a thickness of the first adhesive layer to a thickness of the barrier film is 1:3 to 1:11.

2. The foldable display device according to claim 1, wherein a thickness of the barrier film is 30 μm to 70 μm, a thickness of the first adhesive layer is 5 μm to 10 μm, and a modulus of the first adhesive layer is $5\times10^4$ Pa to $5\times10^8$ Pa.

3. The foldable display device according to claim 1, wherein a modulus of the barrier film is $5\times10^8$ Pa to $10^{10}$ Pa, and a Poisson's ratio of the barrier film is 0.3 to 0.5.

4. The foldable display device according to claim 1, wherein a thickness of the glass is 50 μm to 120 μm and a modulus of the glass is $10^{10}$ Pa to $10^{12}$ Pa.

5. The foldable display device according to claim 1, wherein the barrier film includes a polymer substrate disposed on the first adhesive layer and a hard coating layer disposed on the polymer substrate.

6. The foldable display device according to claim 1, wherein the cover member further includes a decorative layer which is disposed between the glass and the barrier film and is disposed to enclose an outer portion of the first adhesive layer, and a thickness of the decorative layer is equal to a thickness of the first adhesive layer.

7. The foldable display device according to claim 6, wherein the decoration layer includes a material which absorbs light.

8. The foldable display device according to claim 1, wherein a thickness of the barrier film is 45 μm to 70 μm and a ratio of the thickness of the first adhesive layer to the thickness of the barrier film is 1:10 to 1:14, and wherein the cover member further includes a neutral plane compensation layer disposed below the glass and the neutral plane compensation layer includes a buffer layer and a second adhesive layer disposed between the buffer layer and the glass.

9. The foldable display device according to claim 8, wherein a thickness of the buffer layer is 30 μm to 70 μm and a modulus of the buffer layer is $5\times10^7$ Pa to $5\times10^9$ Pa.

10. The foldable display device according to claim 8, wherein a thickness of the second adhesive layer is 5 μm to 10 μm and a modulus of the second adhesive layer is $5\times10^4$ Pa to $5\times10^8$ Pa.

11. The foldable display device according to claim 8, wherein a side surface of the neutral plane compensation layer is located inside a side surface of the support member.

12. The foldable display device according to claim 1, further comprising:

a cover member adhesive layer disposed between the cover member and the flexible display panel, wherein a side surface of the cover member adhesive layer is located inside a side surface of the flexible display panel and a side surface of the cover member.

13. The foldable display device according to claim 12, wherein the side surface of the flexible display panel is located inside of a side surface of the cover member.

14. The foldable display device according to claim 13, wherein a side surface of the glass and a side surface of the first adhesive layer are located inside of the side surface of the barrier film.

15. The foldable display device according to claim 1, further comprising an adhesive member disposed between the flexible display panel and the support member, wherein a side surface of the adhesive member is located inside a side surface of the flexible display panel and a side surface of the support member.

16. The foldable display device according to claim 1, wherein the support member includes an opening pattern or a groove pattern in a location corresponding to the folding area of the foldable display device.

17. The foldable display device according to claim 1, wherein a width of the support member is larger than that of the flexible display panel and smaller than that of the support member.

* * * * *